United States Patent
Yu et al.

(10) Patent No.: US 11,162,562 B2
(45) Date of Patent: Nov. 2, 2021

(54) TRANSVERSELY-PLACED VEHICLE DRIVING ASSEMBLY

(71) Applicant: Jing-Jin Electric Technologies Co., Ltd., Beijing (CN)

(72) Inventors: Ping Yu, Beijing (CN); Jianwen Li, Beijing (CN)

(73) Assignee: JING-JIN ELECTRIC TECHNOLOGIES CO., LTD., Beijing (CN)

(*) Notice: Subject to any disclaimer, the term of this patent is extended or adjusted under 35 U.S.C. 154(b) by 0 days.

(21) Appl. No.: 15/767,608

(22) PCT Filed: Sep. 8, 2017

(86) PCT No.: PCT/CN2017/101047
§ 371 (c)(1),
(2) Date: Apr. 11, 2018

(87) PCT Pub. No.: WO2019/019293
PCT Pub. Date: Jan. 31, 2019

(65) Prior Publication Data
US 2020/0240493 A1    Jul. 30, 2020

(30) Foreign Application Priority Data

Jul. 27, 2017 (CN) .......................... 201710626171.9

(51) Int. Cl.
*F16H 3/091* (2006.01)
*F16H 3/00* (2006.01)
(Continued)

(52) U.S. Cl.
CPC ............... *F16H 3/091* (2013.01); *B60K 1/02* (2013.01); *B60K 5/08* (2013.01); *B60K 17/02* (2013.01);
(Continued)

(58) Field of Classification Search
CPC ...... F16H 3/091; F16H 3/006; F16H 37/0813; B60K 5/08
(Continued)

(56) References Cited

U.S. PATENT DOCUMENTS 5,943,918 A * 8/1999 Reed, Jr. ............. F16H 63/3416
74/661
6,019,698 A * 2/2000 Lawrie .................. B60W 20/40
477/5
(Continued)

FOREIGN PATENT DOCUMENTS

| CN | 102392885 A | 3/2012 |
|----|-------------|--------|
| CN | 203032381 U | 7/2013 |

(Continued)

OTHER PUBLICATIONS

European Search Report issued in Application No. 17919066.5 dated Mar. 3, 2020.
(Continued)

*Primary Examiner* — Ha Dinh Ho
(74) *Attorney, Agent, or Firm* — Fox Rothschild LLP; Carol E. Thorstad-Forsyth

(57) ABSTRACT

The present disclosure discloses a transversely-placed vehicle driving assembly, connected to a vehicle axle half shaft, wherein the vehicle driving assembly comprises a first power source and an automatic transmission, the automatic transmission is provided with a first input shaft therein, the first power source connects to the first input shaft, and a differential is provided at a joint of the automatic transmission and the vehicle axle half shaft; an intermediate shaft is provided parallel to the first input shaft; several gears are fixed or rotatably installed on the first input shaft, several gears are fixed or rotatably installed on the intermediate shaft, the gears on the first input shaft and the gears on the intermediate shaft are in engaged transmission in group, and
(Continued)

the gears that engage with one another have different installing modes on the shafts; clutches are provided between the first input shaft and the gear that is rotatably installed thereon and between the intermediate shaft and the gear that is rotatably installed thereon; and engaging gear transmission is provided between the intermediate shaft and the differential. The present disclosure can realize transmission of two speed ratios, with flexible transmission modes, which shortens the axial size of the driving assembly, which cannot only satisfy the acceleration capability and climbing ability of the vehicle but also satisfy the demand on high vehicle speed.

9 Claims, 7 Drawing Sheets

(51) Int. Cl.
| | |
|---|---|
| F16H 37/08 | (2006.01) |
| B60K 5/08 | (2006.01) |
| B60K 1/02 | (2006.01) |
| B60K 17/02 | (2006.01) |
| B60K 17/06 | (2006.01) |
| B60K 17/16 | (2006.01) |
| B60K 17/22 | (2006.01) |

(52) U.S. Cl.
CPC .............. *B60K 17/06* (2013.01); *B60K 17/16* (2013.01); *B60K 17/22* (2013.01); *F16H 3/006* (2013.01); *F16H 37/0813* (2013.01)

(58) Field of Classification Search
USPC .......................................... 74/661, 325, 331
See application file for complete search history.

(56) References Cited

U.S. PATENT DOCUMENTS

| | | | | |
|---|---|---|---|---|
| 6,341,541 B1* | 1/2002 | Sakamoto | ............. | B60W 10/10 |
| | | | | 74/665 A |
| 6,722,230 B2* | 4/2004 | Sakamoto | ............. | B60K 6/547 |
| | | | | 74/661 |
| 9,637,115 B2* | 5/2017 | Zhu | ......................... | B60K 6/387 |
| 9,822,860 B2* | 11/2017 | Kaltenbach | ............... | F16H 3/54 |
| 2013/0116078 A1 | 5/2013 | Hokoi | | |
| 2014/0033844 A1 | 2/2014 | Rothvoss et al. | | |
| 2017/0175863 A1 | 6/2017 | Kramer et al. | | |
| 2018/0304732 A1 | 10/2018 | Yu et al. | | |
| 2019/0017572 A1 | 1/2019 | Yu et al. | | |
| 2019/0366822 A1 | 12/2019 | Yu et al. | | |

FOREIGN PATENT DOCUMENTS

| | | |
|---|---|---|
| CN | 204367890 U | 6/2015 |
| CN | 105682966 A | 6/2016 |
| CN | 205423703 U | 8/2016 |
| CN | 106499790 A | 3/2017 |
| CN | 106523629 A | 3/2017 |
| CN | 106627078 A | 5/2017 |
| CN | 206277947 U | 6/2017 |
| CN | 206280446 U | 6/2017 |
| CN | 106931089 A | 7/2017 |
| EP | 1122110 A2 | 8/2001 |
| EP | 3023286 A1 | 5/2016 |
| EP | 2696104 A | 11/2016 |
| JP | S59091431 U | 6/1984 |
| JP | S616026 U | 1/1986 |
| JP | 2004210028 A | 7/2004 |
| JP | 201509648 A | 1/2015 |
| JP | 2015009648 A | 1/2015 |
| JP | 2015140127 A | 8/2015 |
| JP | 2016516161 A | 6/2016 |
| WO | 2014136364 A1 | 9/2014 |
| WO | 2014139744 A1 | 9/2014 |
| WO | 2018121515 A1 | 7/2018 |

OTHER PUBLICATIONS

International Search Report issued in Application No. PCT/CN2017/101047 dated Mar. 22, 2018.
Written Opinion of the International Searching Authority issued in Application No. PCT/CN2017/101047 dated Apr. 19, 2018.
Notice of Reasons for Refusal issued in Japanese Patent Application No. 2020-503853 dated Feb. 24, 2021.
Notice of Reasons for Refusal issued in Japanese Patent Application No. 2020-503853 dated Jun. 23, 2021.

* cited by examiner

TRANSVERSELY-PLACED VEHICLE DRIVING ASSEMBLY

RELATED APPLICATION DATA

The present application is the U.S. National Phase of International Patent Application No. PCT/CN2017/101047, filed on Sep. 8, 2017 and entitled "TRANSVERSELY-PLACED VEHICLE DRIVING ASSEMBLY," which claims priority to Chinese Patent Application No. CN 201710626171.9, filed on Jul. 27, 2017 and entitled "TRANSVERSELY-PLACED VEHICLE DRIVING ASSEMBLY," the contents of which are incorporated herein by reference in their entireties.

TECHNICAL FIELD

The present disclosure relates to a transversely-placed vehicle driving assembly, connected to the vehicle front axle or rear axle, for driving the vehicle.

BACKGROUND ART

In current purely electrical driven or mixed power new energy automobiles, the dynamic characteristics of the employed electric motors do not conform to the requirements on the entire vehicle, which cannot satisfy the requirements on speed ratio and torque. Because new energy automobiles are required to face increasingly complicated operating conditions and road conditions, and the users are having increasingly higher requirements on the comfort degree and the endurance mileage of new energy automobiles, the new energy automobiles of simple electric motor directly driving mode, electric-motor-connected-to-speed-reducer mode or oil-electricity mixed power mode cannot satisfy the demands on the development of the new energy automobile industry.

SUMMARY OF THE DISCLOSURE

Regarding the above problems in the prior art, the present disclosure provides a transversely-placed vehicle driving assembly, to solve the problem that the existing power assemblies have transmission of single speed ratio, which cannot satisfy the demands on the acceleration capability, climbing ability and highest speed of vehicles and cannot adapt for complicated road conditions and operating conditions.

Additionally, by the integration structure of the electrical motor and the transmission, the present disclosure solves the problems that the existing power assemblies have large axial sizes and are difficult to be arranged on vehicles, and that the gears in transmissions have high numbers, which makes the transmission structures complicated.

By introducing the second electrical motor, the present disclosure also solves the problem of new energy automobiles that the powers of the electrical motor and the second gear transmission are interrupted in gear shifting, to make the power nature of the vehicles more strong and with more driving sense.

To achieve the above objects, the technical solutions of the present disclosure are realized as follows:

The present disclosure provides a transversely-placed vehicle driving assembly, connected to a vehicle axle half shaft, wherein the vehicle driving assembly comprises a first power source and an automatic transmission, the automatic transmission is provided with a first input shaft therein, the first power source connects to the first input shaft, and a differential is provided at a joint of the automatic transmission and the vehicle axle half shaft; and in the automatic transmission, an intermediate shaft is provided parallel to the first input shaft; wherein, a first gear and a third gear are fixed or rotatably installed on the first input shaft, and a second gear and a fourth gear are fixed or rotatably installed on the intermediate shaft, wherein the first gear and the second gear are in engaged transmission, and have different installing modes on the shafts, and wherein the third gear and the fourth gear are in engaged transmission, and have different installing modes on the shafts;

a clutch is provided between the first input shaft and the gear that is rotatably installed on the first input shaft, and a clutch is provided between the intermediate shaft and the gear that is rotatably installed on the intermediate shaft; and a fifth gear is fixed on the intermediate shaft, and a sixth gear is fixed on the differential, wherein the fifth gear and the sixth gear are in engaged transmission.

Optionally, the first gear and/or the third gear are rotatably installed on the first input shaft via a needle bearing, and the second gear and/or the fourth gear are rotatably installed on the intermediate shaft via a needle bearing.

Optionally, the first gear and the third gear are rotatably installed on the first input shaft via a needle bearing, and the first input shaft is provided thereon with a bidirectional clutch that cooperates with the first gear and the third gear.

Optionally, the second gear and the fourth gear are rotatably installed on the intermediate shaft via a needle bearing, and the intermediate shaft is provided thereon with a bidirectional clutch that cooperates with the second gear and the fourth gear.

Optionally, an engagement transmission ratio of the first gear to the second gear is i1, an engagement transmission ratio of the third gear to the fourth gear is i2, an engagement transmission ratio of the fifth gear to the sixth gear is i3, and an engagement transmission ratio in the automatic transmission is i1×i3 or i2×i3.

Optionally, the vehicle driving assembly further comprises a second power source, the second power source connects to a second input shaft, the second input shaft is arranged parallel to the first input shaft and the intermediate shaft, and the second input shaft is provided thereon with a seventh gear, and the seventh gear engages with the first gear, or the second gear, or the third gear, or the fourth gear, or the fifth gear, to always transmit power to the vehicle axle half shaft, without being affected by the opening or closing of the clutch.

Optionally, the seventh gear and the first gear or the third gear, when engaged, form a triple gear, a transmission ratio of the triple gear is i4, an engagement transmission ratio of the fifth gear to the sixth gear is i3, and when only the second power source transmits power to the vehicle axle half shaft, the engagement transmission ratio in the automatic transmission is i4×i3;

the seventh gear and the second gear or the fourth gear, when engaged, form a dual gear, a transmission ratio of the dual gear is i4, an engagement transmission ratio of the fifth gear to the sixth gear is i3, and when only the second power source transmits power to the vehicle axle half shaft, the engagement transmission ratio in the automatic transmission is i4×i3; and the seventh gear and the fifth gear, when engaged, form a triple gear, a transmission ratio of the triple gear is i4, and when only the second power source transmits power to the vehicle axle half shaft, the engagement transmission ratio in the automatic transmission is i4.

Optionally, a rotor shaft of the first power source and the first input shaft are of integrated design, and a rotor shaft of the second power source and the second input shaft are of integrated design.

Optionally, the clutches are contrate tooth clutches, comprising a movable fluted disc and a fixed fluted disc, wherein the movable fluted disc is rotatably installed on the first input shaft and/or the intermediate shaft, and the fixed fluted disc is fixed on any gear that is rotatably installed and installed; or the clutches are wet clutches.

Optionally, the contrate tooth clutches are of electromagnetic driving type, or hydraulic driving type, or pneumatic driving type, or electrical driving type, or mechanic shifting fork driving type, and drive the movable fluted disc to axially move to engage with the fixed fluted disc.

The present disclosure, which employs the above structure configurations, has the following advantages:

The vehicle driving assembly of the present disclosure is connected to the rear axle half shaft or front axle half shaft of the vehicle. The vehicle driving assembly can realize transmission of two speed ratios, with flexible transmission modes, which satisfies the demands of the vehicle on traveling on different road conditions. When the vehicle needs quick acceleration or is climbing a slope with a weight burden, it can select the transmission of the larger speed ratio, to increase the driving force of the entire vehicle and overcome the defect of the deficient driving force of the entire vehicle. When the entire vehicle is in the cruising condition, it can select the transmission of the smaller speed ratio, to satisfy the requirement by the entire vehicle on high speed traveling, save energy, and increase the endurance mileage of the vehicle.

By introducing the second electrical motor, the present disclosure also solves the problem of new energy automobiles that the powers of the electrical motor and the second gear transmission are interrupted in gear shifting, to make the power nature of the vehicles more strong and with more driving sense.

Furthermore, in the start up of the vehicle, the first electrical motor and the second electrical motor simultaneously start up, which can increase the total driving force of the driving assembly, and shorten the acceleration process of the vehicle, to realize high speed traveling more quickly.

The transversely-placed single-electrical-motor and/or double-electrical-motor vehicle driving assembly that is provided by the present disclosure does not only shorten the axial size of the driving assembly, which facilitates the arranging in the entire vehicle, but also, because it uses less number of gears, simplify the transmission structure.

DETAILED DESCRIPTION

In order to make the objects, the technical solutions and the advantages of the present disclosure clearer, the embodiments of the present disclosure will be described below in further detail in conjunction with the drawings.

The First Embodiment

Figure 1:
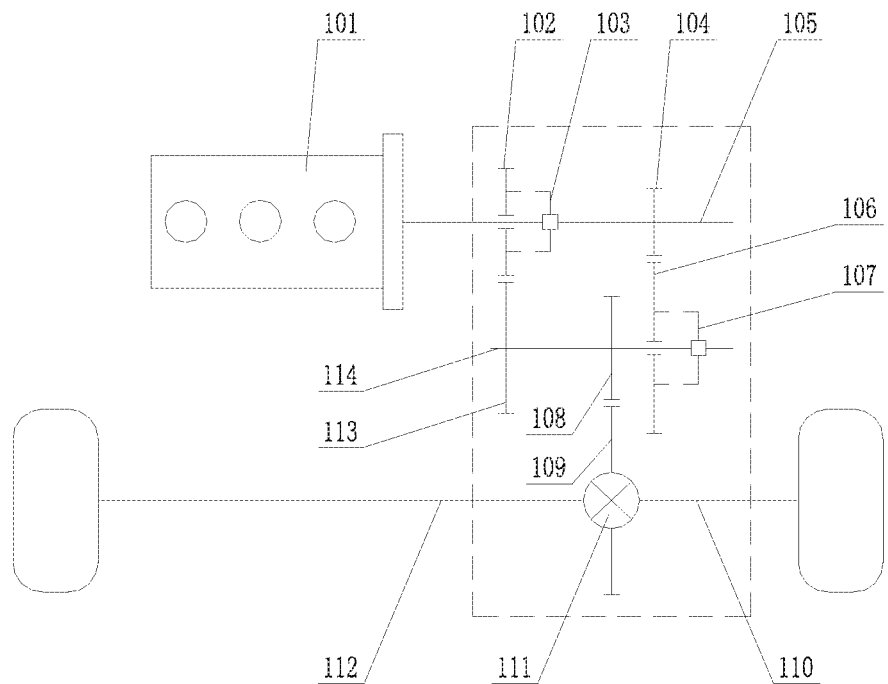
FIG. 1 is the structural schematic diagram of the transversely-placed single-power-source vehicle driving assembly of the first embodiment of the present disclosure.

FIG. 1 shows the first embodiment of the present disclosure. The figure shows: 101. power source; 102. first gear; 103. first clutch; 104. third gear; 105. input shaft; 106. fourth gear; 107. second clutch; 108. fifth gear; 109. sixth gear; 110. right half shaft; 111. differential; 112. left half shaft; 113. second gear; and 114. intermediate shaft.

In the present embodiment, the present disclosure discloses a transversely-placed vehicle driving assembly, connected to a vehicle axle half shaft, wherein the vehicle driving assembly comprises the power source 101 and an automatic transmission (shown by the dotted line in FIG. 1), the automatic transmission is provided with the input shaft 105 therein, the power source 101 connects to the input shaft 105, and the differential 111 is provided at a joint of the automatic transmission and the vehicle axle half shaft.

In the automatic transmission, the intermediate shaft 114 is provided parallel to the input shaft 105.

The first gear 102 is rotatably installed on the input shaft 105, and the third gear 104 is fixedly installed on the input shaft 105. The second gear 113 is fixedly installed on the intermediate shaft 114, and the fourth gear 106 is rotatably installed on the intermediate shaft 114. The first gear 102 and the second gear 113 are in engaged transmission. The third gear 104 and the fourth gear 106 are in engaged transmission.

The first gear 102 and the second gear 113 have different installing modes on the shafts, and the third gear 104 and the fourth gear 106 have different installing modes on the shafts, so are they in the other embodiments.

The first clutch 103 is provided between the input shaft 105 and the first gear 102 rotatably installed thereon, and the second clutch 107 is provided between the intermediate shaft 114 and the fourth gear 106 rotatably installed thereon.

The fifth gear 108 is fixed on the intermediate shaft 114, and the sixth gear 109 is fixed on the differential 111, wherein the fifth gear 108 and the sixth gear 109 are in engaged transmission.

The first gear 102 is rotatably installed on the input shaft 105 via a needle bearing, and the fourth gear 106 is rotatably installed on the intermediate shaft 114 via a needle bearing. Both of the first gear 102 and the fourth gear 106 do not axially move, although they are rotatably installed.

The first clutch 103 and the second clutch 107 are contrate tooth clutches, comprising a movable fluted disc and a fixed fluted disc. The movable fluted disc of the first clutch 103 is rotatably installed on the input shaft 105, and the mating fixed fluted disc is fixed on the first gear 102. The movable fluted disc of the second clutch 107 is rotatably installed on the intermediate shaft 114, and the mating fixed fluted disc is fixed on the fourth gear 106.

It is set that the engagement transmission ratio of the first gear 102 to the second gear 113 is i1, the engagement transmission ratio of the third gear 104 to the fourth gear 106 is i2, and the engagement transmission ratio of the fifth gear 108 to the sixth gear 109 is i3.

When the first clutch 103 is closed and the second clutch 107 is opened, the power source 101 transmits power to the vehicle axle half shaft via successively the input shaft 105, the first clutch 103, the first gear 102, the second gear 113, the intermediate shaft 114, the fifth gear 108, the sixth gear 109 and the differential 111, and the engagement transmission ratio in the automatic transmission is i1×i3. That is the first operating condition.

When the first clutch 103 is opened and the second clutch 107 is closed, the power source 101 transmits power to the vehicle axle half shaft via successively the input shaft 105, the third gear 104, the fourth gear 106, the second clutch 107, the intermediate shaft 114, the fifth gear 108, the sixth gear 109 and the differential 111, and the engagement transmission ratio in the automatic transmission is i2×i3. That is the second operating condition.

When both of the first clutch 103 and the second clutch 107 are opened, neutral position is realized, and at this point no power is outputted to the differential 111.

In that, the magnitudes of the transmission ratios i1, i2 and i3 can be changed by changing the sizes or the tooth numbers of the gears, to change the transmission ratio of the automatic transmission.

It can be known from the above that, the vehicle driving assembly can realize transmission of two speed ratios, and the automatic transmission, according to the control strategy program, can realize the electrically controlled automatic transmission of two gears. The transmission modes are flexible, which satisfies the demands of the vehicle on traveling on different road conditions. When the vehicle is starting, accelerating and climbing a slope with a weight burden, it can select the transmission of the larger speed ratio, to increase the driving force of the entire vehicle and overcome the defect of the deficient driving force of the entire vehicle. When the entire vehicle is in the cruising condition, it can select the transmission of the smaller speed ratio, to satisfy the requirement by the entire vehicle on high speed traveling, save energy, and increase the endurance mileage of the vehicle.

In the present embodiment, the rotor shaft of the power source 101 and the input shaft 105 are of integrated design, which can reduce the impact by the rotor shaft on the automatic transmission. The power source 101 may be an electric motor or an engine.

In the first clutch 103 and the second clutch 107, the movable fluted disc may slide on the shaft via a spline. The center hole of the movable fluted disc is provided with an internal spline, and correspondingly external splines are provided on the input shaft 105 and the intermediate shaft 114, and should have larger lengths than the internal spline of the movable fluted disc, merely by which the movable fluted disc can be nested on the shafts, and can axially slide and output torques.

The movable fluted disc is provided with end face transmission teeth or tooth spaces, and the fixed fluted disc is correspondingly provided with end face tooth spaces or transmission teeth. The contrate tooth clutches, compared with friction clutches, can reduce kinetic energy loss to the largest extent, which overcomes the defect of traditional friction clutches of too short lives because they cannot withstand the dynamic shock of the electric motor.

The driving type of the contrate tooth clutches may be electromagnetic driving type, by driving by electromagnet adsorption, or hydraulic driving type, by driving by a hydraulic mechanism, or pneumatic driving type, by driving by a pneumatic mechanism, or electrical driving type, by driving by an electric motor, or mechanic shifting fork driving type, by driving by a shifting fork, and the contrate tooth clutches drive the movable fluted disc to axially move to engage with the fixed fluted disc.

In the case that the first clutch 103 and the second clutch 107 are electromagnetic jaw clutches, when the vehicle driving assembly has power inputting, the electromagnetic jaw clutches can enable the power and the entire vehicle to be released and engaged instantly at any torque, which realizes the smooth switch of the power and increases the traveling stability of the vehicle.

Alternatively, the first clutch 103 and the second clutch 107 employ wet clutches, and the wet clutches are provided therein with dual friction plates and steel straps, and enable the friction plates and the steel straps to contact or separate by hydraulic oil driving, thereby realizing clutching. The wet clutches are required to be installed to realize the clutching of the input shaft 105 and the first gear 102 rotatably installed thereon, and the clutching of the intermediate shaft 114 and the fourth gear 106 rotatably installed thereon.

The vehicle axle half shaft is as shown by FIG. 1, and comprises the right half shaft 110 and the left half shaft 112. In the embodiments of the present disclosure, the vehicle axle half shaft is a front axle half shaft or a rear axle half shaft. When the vehicle driving assembly connects to the front axle half shaft, the vehicle is in the front driving mode, and when the vehicle driving assembly connects to the rear axle half shaft, the vehicle is of the rear driving mode.

The Second Embodiment

Figure 2:
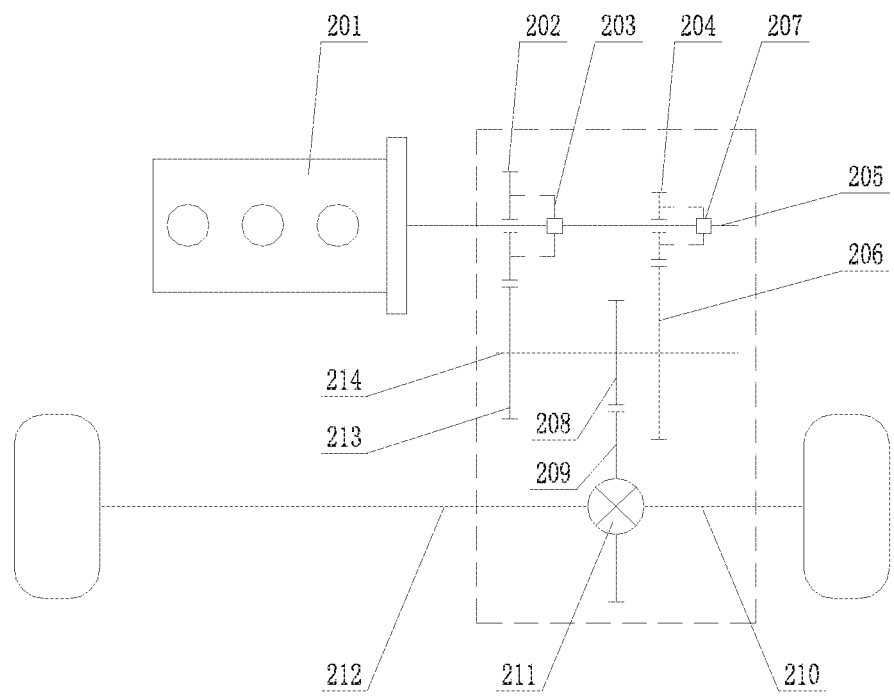
FIG. 2 is the structural schematic diagram of the transversely-placed single-power-source vehicle driving assembly of the second embodiment of the present disclosure.

FIG. 2 shows the second embodiment of the present disclosure. The figure shows: 201. power source; 202. first gear; 203. first clutch; 204. third gear; 205. input shaft; 206. fourth gear; 207. second clutch; 208. fifth gear; 209. sixth gear; 210. right half shaft; 211. differential; 212. left half shaft; 213. second gear; and 214. intermediate shaft.

The second embodiment of the present disclosure is improvement that is made on the basis of the first embodiment, and the difference between the second embodiment and the first embodiment of the present disclosure is that, as shown by FIG. 2, the second clutch 107 is rotatably installed on the input shaft 205, and the mating fixed fluted disc is fixed on the third gear 204, wherein the third gear 204 is rotatably installed and installed on the input shaft 205.

It is set that the engagement transmission ratio of the first gear 202 to the second gear 213 is i1, the engagement transmission ratio of the third gear 204 to the fourth gear 206 is i2, and the engagement transmission ratio of the fifth gear 208 to the sixth gear 209 is i3.

When the first clutch 203 is closed and the second clutch 207 is opened, the power source 201 transmits power to the vehicle axle half shaft via successively the input shaft 205, the first clutch 203, the first gear 202, the second gear 213, the intermediate shaft 214, the fifth gear 208, the sixth gear 209 and the differential 211, and the engagement transmission ratio in the automatic transmission is i1×i3. That is the first operating condition.

When the first clutch 203 is opened and the second clutch 207 is closed, the power source 201 transmits power to the vehicle axle half shaft via successively the input shaft 205, the second clutch 207, the third gear 204, the fourth gear 206, the intermediate shaft 214, the fifth gear 208, the sixth gear 209 and the differential 211, and the engagement transmission ratio in the automatic transmission is i2×i3. That is the second operating condition.

When both of the first clutch 203 and the second clutch 207 are opened, neutral position is realized, and at this point no power is outputted to the differential 211.

The other contents of the second embodiment of the present disclosure are the same as those of the first embodiment, and will not be described repeatedly here.

The Third Embodiment

Figure 3:
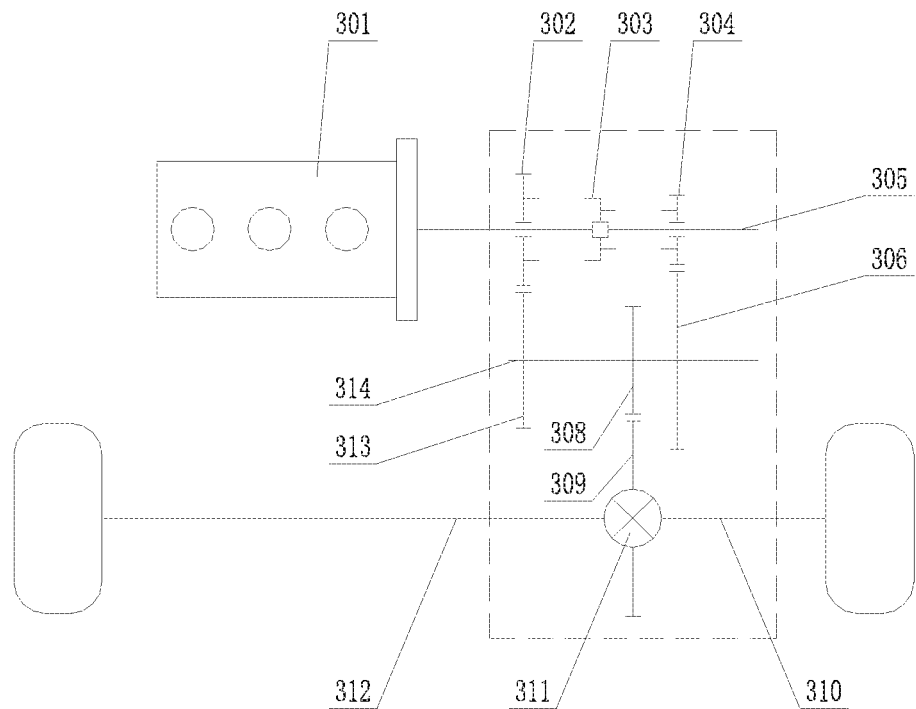
FIG. 3 is the structural schematic diagram of the transversely-placed single-power-source vehicle driving assembly of the third embodiment of the present disclosure.

FIG. 3 shows the third embodiment of the present disclosure. The figure shows: 301. power source; 302. first gear; 303. bidirectional clutch; 304. third gear; 305. input shaft; 306. fourth gear; 308. fifth gear; 309. sixth gear; 310. right half shaft; 311. differential; 312. left half shaft; 313. second gear; and 314. intermediate shaft.

The third embodiment of the present disclosure is improvement that is made on the basis of the second embodiment, and the difference between the third embodiment and the second embodiment of the present disclosure is that, as shown by FIG. 3, the bidirectional clutch 303 is rotatably installed on the input shaft 305, contrate teeth are provided on both of the left and right sides of the bidirectional clutch 303, which is equivalent to two movable fluted discs, both of the third gear 304 and the first gear 302 are rotatably installed on the input shaft 305, and both of the two gears are fixedly provided with mating fixed fluted discs.

It is set that the engagement transmission ratio of the first gear 302 to the second gear 313 is i1, the engagement transmission ratio of the third gear 304 to the fourth gear 306 is i2, and the engagement transmission ratio of the fifth gear 308 to the sixth gear 309 is i3.

When the bidirectional clutch 303 moves to the left, it can close with the fixed fluted disc on the first gear 302, the power source 201 transmits power to the vehicle axle half shaft via successively the input shaft 305, the bidirectional clutch 303, the first gear 302, the second gear 313, the intermediate shaft 314, the fifth gear 308, the sixth gear 309 and the differential 311, and the engagement transmission ratio in the automatic transmission is i1×i3. That is the first operating condition.

When the bidirectional clutch 303 moves to the right, it can close with the fixed fluted disc on the third gear 304, the power source 301 transmits power to the vehicle axle half shaft via successively the input shaft 305, the bidirectional clutch 303, the third gear 304, the fourth gear 306, the intermediate shaft 314, the fifth gear 308, the sixth gear 309 and the differential 311, and the engagement transmission ratio in the automatic transmission is i2×i3. That is the second operating condition.

When the bidirectional clutch 303 is in the middle to open with both of the first gear 302 and the third gear 304, neutral position is realized, and at this point no power is outputted to the differential 311.

The other contents of the third embodiment of the present disclosure are the same as those of the second embodiment, and will not be described repeatedly here.

The Fourth Embodiment

Figure 4:
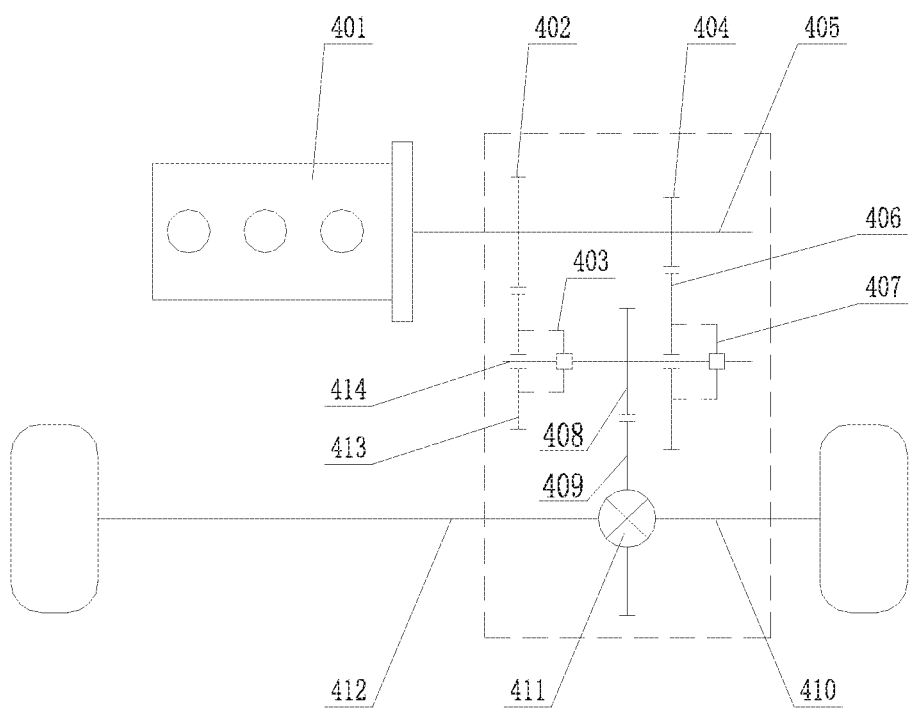
FIG. 4 is the structural schematic diagram of the transversely-placed single-power-source vehicle driving assembly of the fourth embodiment of the present disclosure.

FIG. 4 shows the fourth embodiment of the present disclosure. The figure shows: 401. power source; 402. first gear; 403. first clutch; 404. third gear; 405. input shaft; 406. fourth gear; 407. second clutch; 408. fifth gear; 409. sixth gear; 410. right half shaft; 411. differential; 412. left half shaft; 413. second gear; and 414. intermediate shaft.

The fourth embodiment of the present disclosure is improvement that is made on the basis of the first embodiment, and the difference between the fourth embodiment and the first embodiment of the present disclosure is that, as shown by FIG. 4, the first clutch 403 is rotatably installed on the intermediate shaft 414, and a mating fixed fluted disc is fixedly installed on the second gear 413, wherein the second gear 413 is rotatably installed and installed on the intermediate shaft 414.

It is set that the engagement transmission ratio of the first gear 402 to the second gear 413 is i1, the engagement transmission ratio of the third gear 404 to the fourth gear 406 is i2, and the engagement transmission ratio of the fifth gear 408 to the sixth gear 409 is i3.

When the first clutch 403 is closed and the second clutch 407 is opened, the power source 401 transmits power to the vehicle axle half shaft via successively the input shaft 405, the first gear 402, the second gear 413, the first clutch 403, the intermediate shaft 414, the fifth gear 408, the sixth gear 409 and the differential 411, and the engagement transmission ratio in the automatic transmission is i1×i3. That is the first operating condition.

When the first clutch 403 is opened and the second clutch 407 is closed, the power source 401 transmits power to the vehicle axle half shaft via successively the input shaft 405, the third gear 404, the fourth gear 406, the second clutch 407, the intermediate shaft 414, the fifth gear 408, the sixth gear 409 and the differential 411, and the engagement transmission ratio in the automatic transmission is i2×i3. That is the second operating condition.

When both of the first clutch 403 and the second clutch 407 are opened, neutral position is realized, and at this point no power is outputted to the differential 411.

The other contents of the fourth embodiment of the present disclosure are the same as those of the first embodiment, and will not be described repeatedly here.

The Fifth Embodiment

Figure 5:
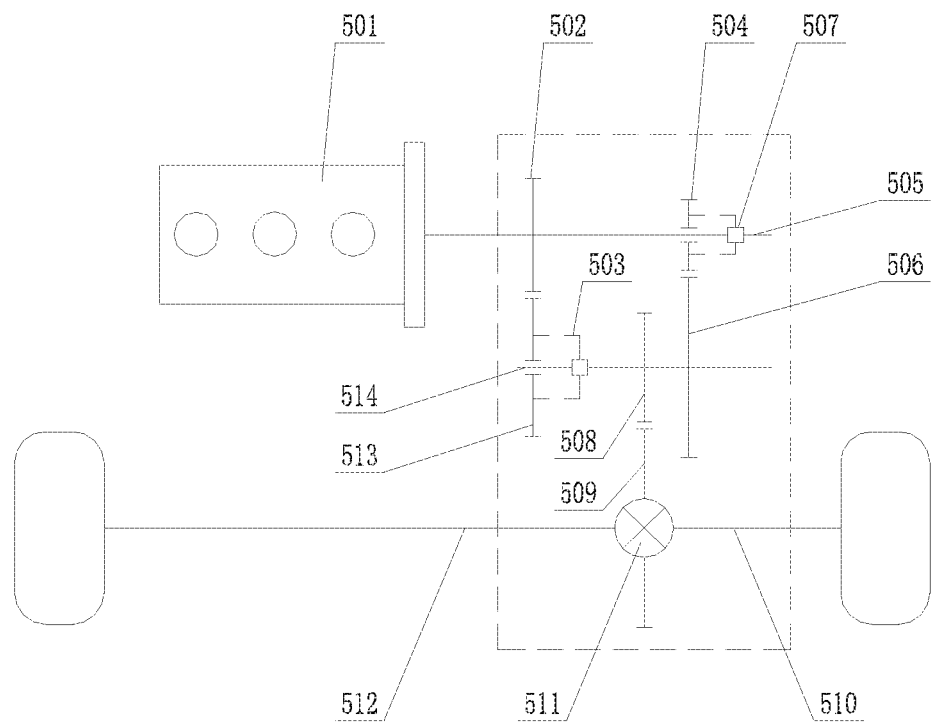
FIG. 5 is the structural schematic diagram of the transversely-placed single-power-source vehicle driving assembly of the fifth embodiment of the present disclosure.

FIG. 5 shows the fifth embodiment of the present disclosure. The figure shows: 501. power source; 502. first gear; 503. first clutch; 504. third gear; 505. input shaft; 506. fourth gear; 507. second clutch; 508. fifth gear; 509. sixth gear; 510. right half shaft; 511. differential; 512. left half shaft; 513. second gear; and 514. intermediate shaft.

The fifth embodiment of the present disclosure is improvement that is made on the basis of the second embodiment, and the difference between the fifth embodiment and the second embodiment of the present disclosure is that, as shown by FIG. 5, the first clutch 503 is rotatably installed on the intermediate shaft 514, and a mating fixed fluted disc is fixed on the second gear 513, wherein the second gear 513 is rotatably installed on the intermediate shaft 514.

It is set that the engagement transmission ratio of the first gear 502 to the second gear 513 is i1, the engagement transmission ratio of the third gear 504 to the fourth gear 506 is i2, and the engagement transmission ratio of the fifth gear 508 to the sixth gear 509 is i3.

When the first clutch 503 is closed and the second clutch 507 is opened, the power source 501 transmits power to the vehicle axle half shaft via successively the input shaft 505, the first gear 502, the second gear 513, the first clutch 503, the intermediate shaft 514, the fifth gear 508, the sixth gear 509 and the differential 511, and the engagement transmission ratio in the automatic transmission is i1×i3. That is the first operating condition.

When the first clutch 503 is opened and the second clutch 507 is closed, the power source 501 transmits power to the vehicle axle half shaft via successively the input shaft 505, the second clutch 507, the third gear 504, the fourth gear 506, the intermediate shaft 514, the fifth gear 508, the sixth gear 509 and the differential, and the engagement transmission ratio in the automatic transmission is i2×i3. That is the second operating condition.

When both of the first clutch 503 and the second clutch 507 are opened, neutral position is realized, and at this point no power is outputted to the differential 511.

The other contents of the fifth embodiment of the present disclosure are the same as those of the second embodiment, and will not be described repeatedly here.

The Sixth Embodiment

Figure 6:
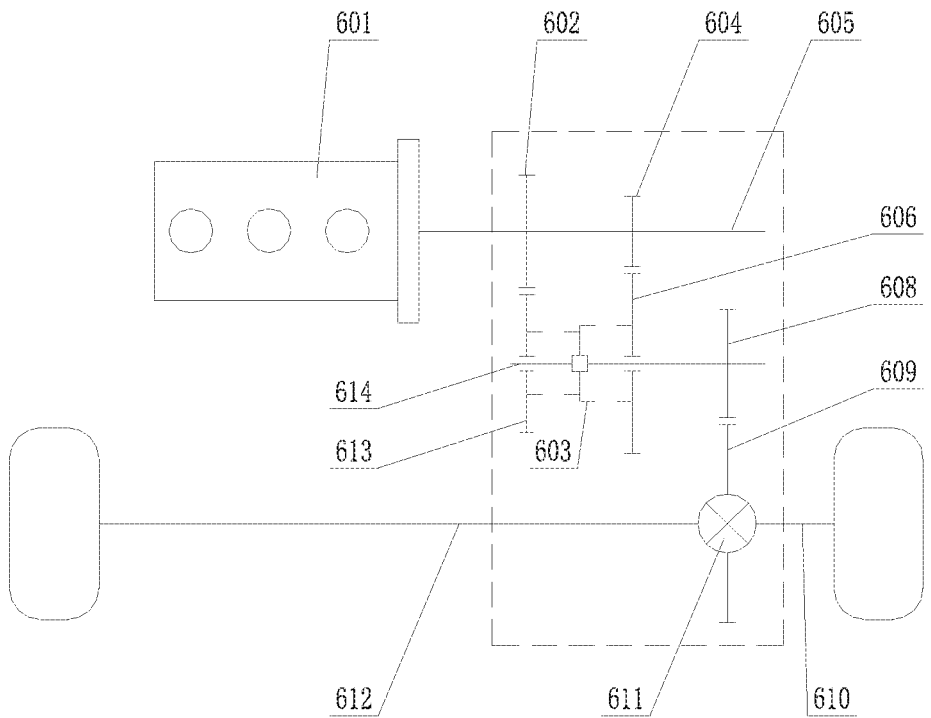
FIG. 6 is the structural schematic diagram of the transversely-placed single-power-source vehicle driving assembly of the sixth embodiment of the present disclosure.

FIG. 6 shows the sixth embodiment of the present disclosure. The figure shows: 601. power source; 602. first gear; 603. bidirectional clutch; 604. third gear; 605. input shaft; 606. fourth gear; 608. fifth gear; 609. sixth gear; 610. right half shaft; 611. differential; 612. left half shaft; 613. second gear; and 614. intermediate shaft.

The sixth embodiment of the present disclosure is improvement that is made on the basis of the third embodiment, and the difference between the sixth embodiment and the third embodiment of the present disclosure is that, as shown by FIG. 6, the bidirectional clutch 603 is rotatably installed on the intermediate shaft 614, contrate teeth are provided on both of the left and right sides of the bidirectional clutch 603, which is equivalent to two movable fluted discs, both of the second gear 613 and the fourth gear 606 are rotatably installed on the intermediate shaft 614, and both of the two gears are fixedly provided with mating fixed fluted discs.

It is set that the engagement transmission ratio of the first gear 602 to the second gear 613 is i1, the engagement transmission ratio of the third gear 604 to the fourth gear 606 is i2, and the engagement transmission ratio of the fifth gear 608 to the sixth gear 609 is i3.

When the bidirectional clutch 603 moves to the left, it can close with the fixed fluted disc on the second gear 613, the power source 601 transmits power to the vehicle axle half shaft via successively the input shaft 605, the first gear 602, the second gear 613, the bidirectional clutch 603, the intermediate shaft 614, the fifth gear 608, the sixth gear 609 and the differential 611, and the engagement transmission ratio in the automatic transmission is i1×i3. That is the first operating condition.

When the bidirectional clutch 603 moves to the right, it can close with the fixed fluted disc on the fourth gear 606, the power source 601 transmits power to the vehicle axle half shaft via successively the input shaft 605, the third gear 604, the fourth gear 606, the bidirectional clutch 603, the intermediate shaft 614, the fifth gear 608, the sixth gear 609 and the differential 611, and the engagement transmission ratio in the automatic transmission is i2×i3. That is the second operating condition.

When the bidirectional clutch 603 is in the middle to open with both of the second gear 613 and the fourth gear 606, neutral position is realized, and at this point no power is outputted to the differential 611.

The other contents of the sixth embodiment of the present disclosure are the same as those of the third embodiment, and will not be described repeatedly here.

The Seventh Embodiment

Figure 7:
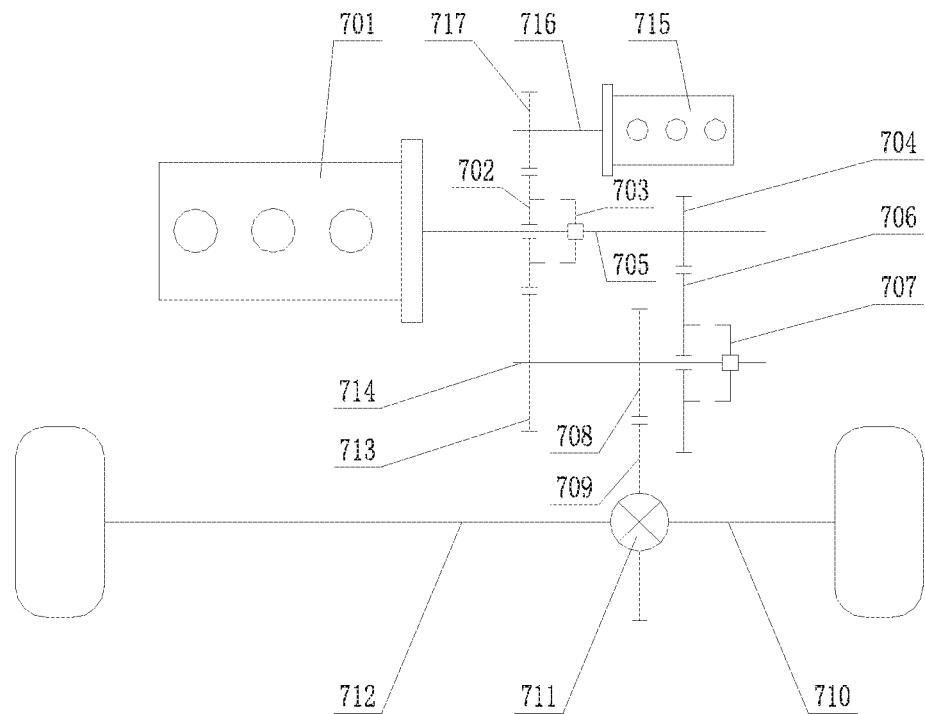
FIG. 7 is the structural schematic diagram of the transversely-placed double-power-source vehicle driving assembly of the seventh embodiment of the present disclosure.

FIG. 7 shows the seventh embodiment of the present disclosure. The figure shows: 701. first power source; 702. first gear; 703. first clutch; 704. third gear; 705. first input shaft; 706. fourth gear; 707. second clutch; 708. fifth gear; 709. sixth gear; 710. right half shaft; 711. differential; 712. left half shaft; 713. second gear; 714. intermediate shaft; 715. second power source; 716. second input shaft; and 717. seventh gear.

The seventh embodiment of the present disclosure is improvement that is made on the basis of the first embodiment, and the difference between the seventh embodiment and the first embodiment of the present disclosure is that, as shown by FIG. 7, the vehicle driving assembly further comprises the second power source 715, the second power source 715 connects to the second input shaft 716, the second input shaft 716 is arranged parallel to the first input shaft 705 and the intermediate shaft 714, the second input shaft 716 is provided thereon with the seventh gear 717, and the seventh gear 717 engages with the first gear 702, to always transmit power to the vehicle axle half shaft, without being affected by the opening or closing of the first clutch 703 and the second clutch 707.

The seventh gear 717, the first gear 702, and the second gear 713 form a triple gear, and the first gear 702 serves as an idle gear. It is set that the transmission ratio of the triple gear is i4, the engagement transmission ratio of the fifth gear 708 to the sixth gear 709 is i3, and when only the second power source 715 transmits power to the vehicle axle half shaft, and the engagement transmission ratio in the automatic transmission is i4×i3.

In gear shifting, the first clutch 703 and the second clutch 707 may probably simultaneously open. At this point, the second power source 715 is started up, its power is transmitted to the vehicle axle half shaft via the second input shaft 716, the seventh gear 717, the first gear 702, the second gear 713, the intermediate shaft 714, the fifth gear 708, the sixth gear 709 and the differential 711, and the engagement transmission ratio in the automatic transmission is i4×i3. That is the third operating condition; that is, the path wherein the power is maintained uninterrupted in gear shifting.

If the first clutch 703 or the second clutch 707 is closed, the second power source 715 is started up, and the power of the second power source 715 will still be transmitted to the vehicle axle half shaft, to increase the total driving force of the driving assembly. In the start up of the vehicle, that can shorten the acceleration process of the vehicle, to realize high speed traveling more quickly. When the vehicle is climbing a slope with a weight burden, it can select the double power inputting and the larger speed ratio transmission, to increase the driving force of the entire vehicle and overcome the defect of the deficient driving force of the entire vehicle.

The second power source 715 employs an electric motor, and the rotor shaft of the second power source 715 and the second input shaft 716 are also of integrated design.

The other contents of the seventh embodiment of the present disclosure are the same as those of the first embodiment, and will not be described repeatedly here.

The Eighth Embodiment

Figure 8:
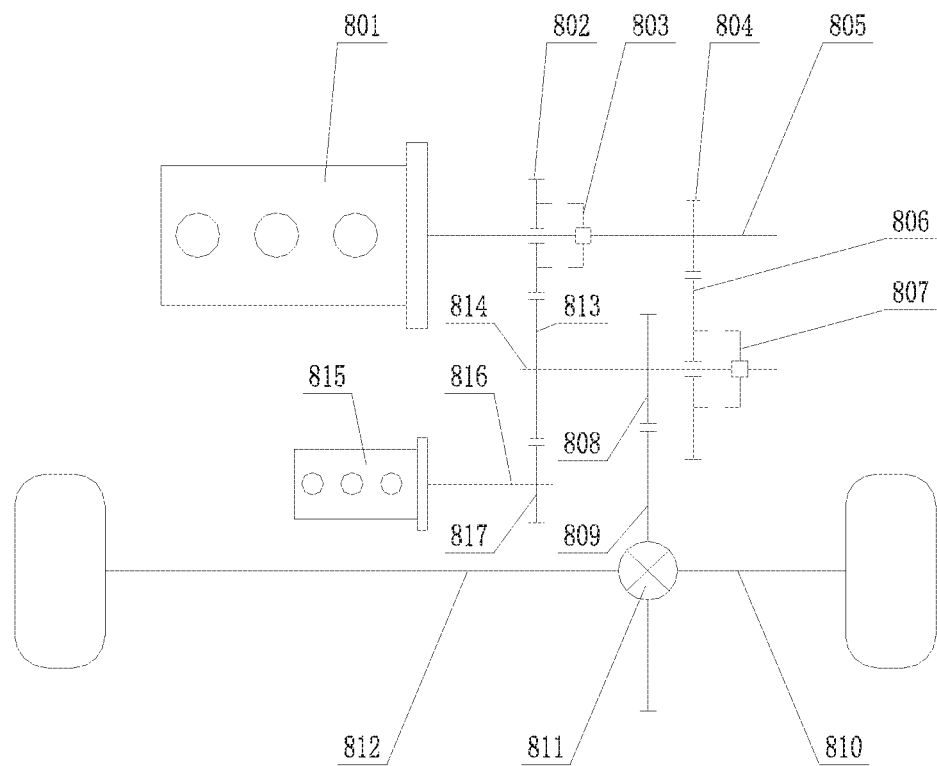
FIG. 8 is the structural schematic diagram of the transversely-placed double-power-source vehicle driving assembly of the eighth embodiment of the present disclosure.

FIG. 8 shows the eighth embodiment of the present disclosure. The figure shows: 801. first power source; 802. first gear; 803. first clutch; 804. third gear; 805. first input shaft; 806. fourth gear; 807. second clutch; 808. fifth gear; 809. sixth gear; 810. right half shaft; 811. differential; 812. left half shaft; 813. second gear; 814. intermediate shaft; 815. second power source; 816. second input shaft; and 817. seventh gear.

The eighth embodiment of the present disclosure is improvement that is made on the basis of the seventh embodiment, and the difference between the eighth embodiment and the seventh embodiment of the present disclosure is that, as shown by FIG. 8, the seventh gear 817 engages with the second gear 813, to always transmit power to the vehicle axle half shaft, without being affected by the opening or closing of the first clutch 803 and the second clutch 807.

It is set that the transmission ratio of the seventh gear 817 to the second gear 813 engaged with it is i4, the engagement transmission ratio of the fifth gear 808 to the sixth gear 809 is i3, and when only the second power source 815 transmits power to the vehicle axle half shaft, the engagement transmission ratio in the automatic transmission is i4×i3.

In gear shifting, the first clutch 803 and the second clutch 807 may probably simultaneously open. At this point, the second power source 815 is started up, its power is transmitted to the vehicle axle half shaft via the second input shaft 816, the seventh gear 817, the second gear 813, the intermediate shaft 814, the fifth gear 808, the sixth gear 809 and the differential 811, and the engagement transmission ratio in the automatic transmission is i4×i3. That is the third operating condition; that is, the path wherein the power is maintained uninterrupted in gear shifting.

If the first clutch 803 or the second clutch 807 is closed, the second power source 815 is started up, and the power of the second power source 815 will still be transmitted to the vehicle axle half shaft, to increase the total driving force of the driving assembly.

The other contents of the eighth embodiment of the present disclosure are the same as those of the seventh embodiment, and will not be described repeatedly here.

The Ninth Embodiment

Figure 9:
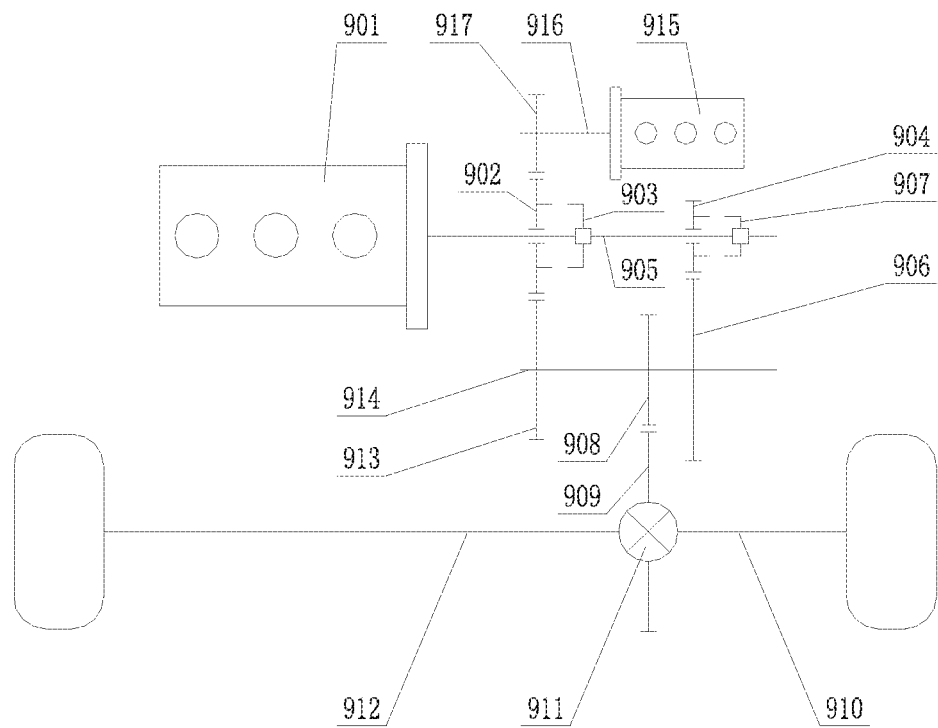
FIG. 9 is the structural schematic diagram of the transversely-placed double-power-source vehicle driving assembly of the ninth embodiment of the present disclosure.

FIG. 9 shows the ninth embodiment of the present disclosure. The figure shows: 901. first power source; 902. first gear; 903. first clutch; 904. third gear; 905. first input shaft; 906. fourth gear; 907. second clutch; 908. fifth gear; 909. sixth gear; 910. right half shaft; 911. differential; 912. left half shaft; 913. second gear; 914. intermediate shaft; 915. second power source; 916. second input shaft; and 917. seventh gear.

The ninth embodiment of the present disclosure is improvement that is made on the basis of the second embodiment, and the difference between the ninth embodiment and the second embodiment of the present disclosure is that, as shown by FIG. 9, the vehicle driving assembly further comprises the second power source 915, the second power source 915 connects to the second input shaft 916, the second input shaft 916 is arranged parallel to the first input shaft 905 and the intermediate shaft 914, the second input shaft 916 is provided thereon with the seventh gear 917, and the seventh gear 917 engages with the first gear 902, to always transmit power to the vehicle axle half shaft, without being affected by the opening or closing of the first clutch 903 and the second clutch 907.

The seventh gear 917, the first gear 902 and the second gear 913 form a triple gear, and the first gear 902 serves as an idle gear. It is set that the transmission ratio of the triple gear is i4, the engagement transmission ratio of the fifth gear 908 to the sixth gear 909 is i3, and when only the second power source 915 transmits power to the vehicle axle half shaft, the engagement transmission ratio in the automatic transmission is i4×i3.

In gear shifting, the first clutch 903 and the second clutch 907 may probably simultaneously open. At this point, the second power source 915 is started up, its power is transmitted to the vehicle axle half shaft via the second input shaft 916, the seventh gear 917, the first gear 902, the second gear 913, the intermediate shaft 914, the fifth gear 908, the sixth gear 909 and the differential 911, and the engagement transmission ratio in the automatic transmission is i4×i3. That is the third operating condition; that is, the path wherein the power is maintained uninterrupted in gear shifting.

If the first clutch 903 or the second clutch 907 is closed, the second power source 915 is started up, and the power of the second power source 915 will still be transmitted to the vehicle axle half shaft, to increase the total driving force of the driving assembly. In the start up of the vehicle, that can shorten the acceleration process of the vehicle, to realize high speed traveling more quickly. When the vehicle is climbing a slope with a weight burden, it can select the double power inputting and the larger speed ratio transmission, to increase the driving force of the entire vehicle and overcome the defect of the deficient driving force of the entire vehicle.

The rotor shaft of the second power source 915 and the second input shaft 916 are also of integrated design.

The other contents of the ninth embodiment of the present disclosure are the same as those of the second embodiment, and will not be described repeatedly here.

The Tenth Embodiment

Figure 10:
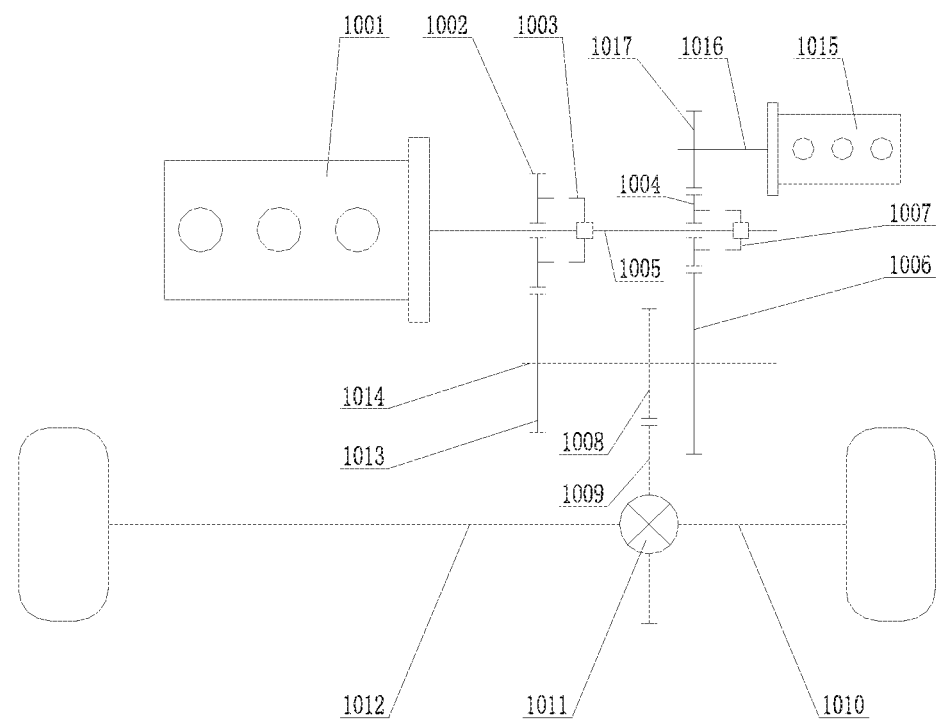
FIG. 10 is the structural schematic diagram of the transversely-placed double-power-source vehicle driving assembly of the tenth embodiment of the present disclosure.

FIG. 10 shows the tenth embodiment of the present disclosure. The figure shows: 1001. first power source; 1002. first gear; 1003. first clutch; 1004. third gear; 1005. first input shaft; 1006. fourth gear; 1007. second clutch; 1008. fifth gear; 1009. sixth gear; 1010. right half shaft; 1011. differential; 1012. left half shaft; 1013. second gear; 1014. intermediate shaft; 1015. second power source; 1016. second input shaft; and 1017. seventh gear.

The tenth embodiment of the present disclosure is improvement that is made on the basis of the ninth embodiment, and the difference between the tenth embodiment and the ninth embodiment of the present disclosure is that, as shown by FIG. 10, the seventh gear 1017 engages with the third gear 1004, to always transmit power to the vehicle axle half shaft, without being affected by the opening or closing of the first clutch 1003 and the second clutch 1007.

The seventh gear 1017, the third gear 1004 and the fourth gear 1006 form a triple gear, and the third gear 1004 serves as an idle gear. It is set that the transmission ratio of the triple gear is i4, the engagement transmission ratio of the fifth gear 1008 to the sixth gear 1009 is i3, and when only the second power source 1015 transmits power to the vehicle axle half shaft, the engagement transmission ratio in the automatic transmission is i4×i3.

In gear shifting, the first clutch 1003 and the second clutch 1007 may probably simultaneously open. At this point, the second power source 1015 is started up, its power is transmitted to the vehicle axle half shaft via the second input shaft 1016, the seventh gear 1017, the third gear 1004, the fourth gear 1006, the intermediate shaft 1014, the fifth gear 1008, the sixth gear 1009 and the differential 1011, and the engagement transmission ratio in the automatic transmission is i4×i3. That is the third operating condition; that is, the path wherein the power is maintained uninterrupted in gear shifting.

If the first clutch 1003 or the second clutch 1007 is closed, the second power source 1015 is started up, and the power of the second power source 1015 will still be transmitted to the vehicle axle half shaft, to increase the total driving force of the driving assembly.

The other contents of the tenth embodiment of the present disclosure are the same as those of the ninth embodiment, and will not be described repeatedly here.

The Eleventh Embodiment

Figure 11:
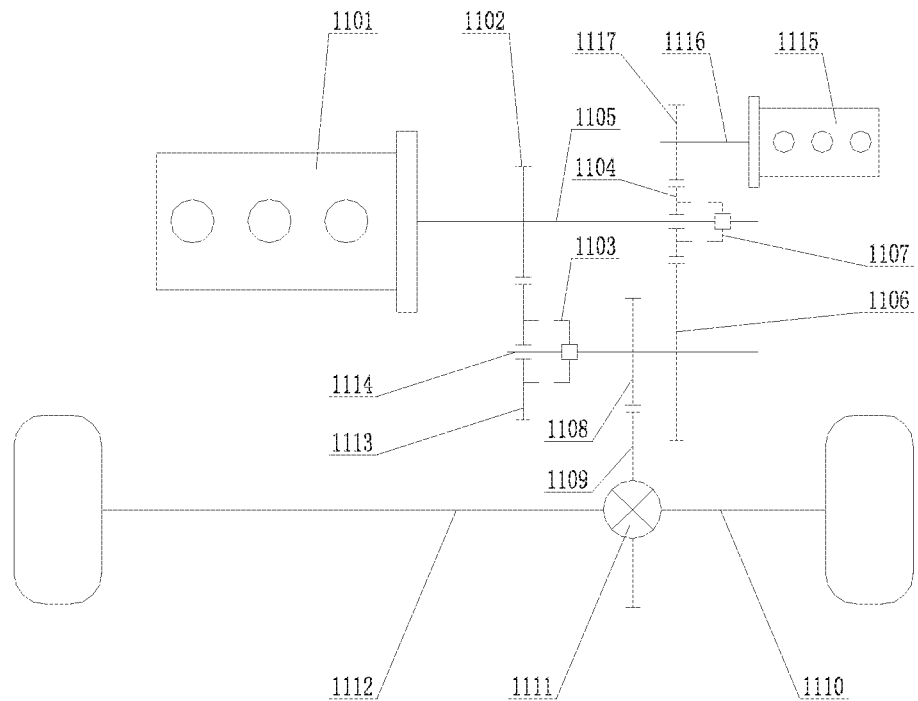
FIG. 11 is the structural schematic diagram of the transversely-placed double-power-source vehicle driving assembly of the eleventh embodiment of the present disclosure.

FIG. 11 shows the eleventh embodiment of the present disclosure. The figure shows: 1101. first power source; 1102. first gear; 1103. first clutch; 1104. third gear; 1105. first input shaft; 1106. fourth gear; 1107. second clutch; 1108. fifth gear; 1109. sixth gear; 1110. right half shaft; 1111. differential; 1112. left half shaft; 1113. second gear; 1114. intermediate shaft; 1115. second power source; 1116. second input shaft; and 1117. seventh gear.

The eleventh embodiment of the present disclosure is improvement that is made on the basis of the fifth embodiment, and the difference between the eleventh embodiment and the fifth embodiment of the present disclosure is that, as shown by FIG. 11, the vehicle driving assembly further comprises the second power source 1115, the second power source 1115 connects to the second input shaft 1116, the second input shaft 1116 is arranged parallel to the first input shaft 1105 and the intermediate shaft 1114, the second input shaft 1116 is provided thereon with the seventh gear 1117, and the seventh gear 1117 engages with the third gear 1104, to always transmit power to the vehicle axle half shaft, without being affected by the opening or closing of the first clutch 1103 and the second clutch 1107.

The seventh gear 1117, the third gear 1104 and the fourth gear 1106 form a triple gear, and the third gear 1104 serves as an idle gear. It is set that the transmission ratio of the triple gear is i4, the engagement transmission ratio of the fifth gear 1108 to the sixth gear 1109 is i3, and when only the second power source 1115 transmits power to the vehicle axle half shaft, the engagement transmission ratio in the automatic transmission is i4×i3.

In gear shifting, the first clutch 1103 and the second clutch 1107 may probably simultaneously open. At this point, the second power source 1115 is started up, its power is transmitted to the vehicle axle half shaft via the second input shaft 1116, the seventh gear 1117, the third gear 1104, the fourth gear 1106, the intermediate shaft 1114, the fifth gear 1108, the sixth gear 909 and the differential 1111, and the engagement transmission ratio in the automatic transmission is i4×i3. That is the third operating condition; that is, the path wherein the power is maintained uninterrupted in gear shifting.

If the first clutch 1103 or the second clutch 1107 is closed, the second power source 1115 is started up, and the power of the second power source 1115 will still be transmitted to the vehicle axle half shaft, to increase the total driving force of the driving assembly. In the start up of the vehicle, that can shorten the acceleration process of the vehicle, to realize high speed traveling more quickly. When the vehicle is climbing a slope with a weight burden, it can select the double power inputting and the larger speed ratio transmission, to increase the driving force of the entire vehicle and overcome the defect of the deficient driving force of the entire vehicle.

The rotor shaft of the second power source 1115 and the second input shaft 1116 are also of integrated design.

The other contents of the eleventh embodiment of the present disclosure are the same as those of the fifth embodiment, and will not be described repeatedly here.

The Twelfth Embodiment

Figure 12:
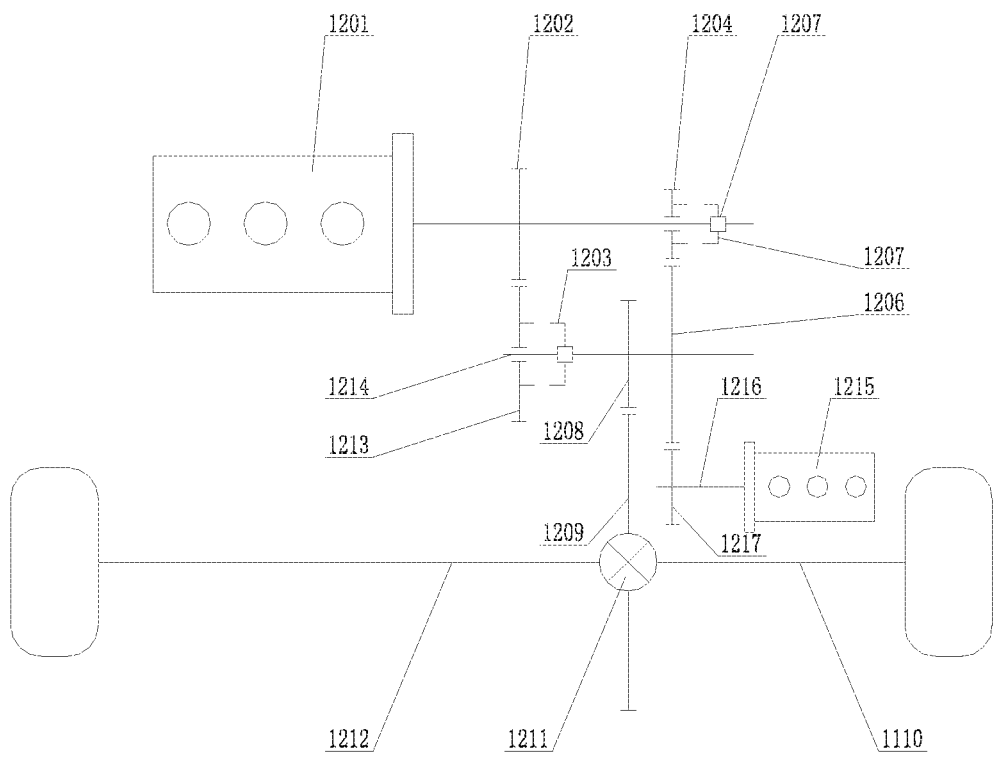
FIG. 12 is the structural schematic diagram of the transversely-placed double-power-source vehicle driving assembly of the twelfth embodiment of the present disclosure.

FIG. 12 shows the twelfth embodiment of the present disclosure. The figure shows: 1201. first power source; 1202. first gear; 1203. first clutch; 1204. third gear; 1205. first input shaft; 1206. fourth gear; 1207. second clutch; 1208. fifth gear; 1209. sixth gear; 1210. right half shaft; 1211. differential; 1212. left half shaft; 1213. second gear; 1214. intermediate shaft; 1215. second power source; 1216. second input shaft; and 1217. seventh gear.

The twelfth embodiment of the present disclosure is improvement that is made on the basis of the eleventh embodiment, and the difference between the twelfth embodiment and the eleventh embodiment of the present disclosure is that, as shown by FIG. 12, the seventh gear 1217 engages with the fourth gear 1206, to always transmit power to the vehicle axle half shaft, without being affected by the opening or closing of the first clutch 1203 and the second clutch 1207.

It is set that the transmission ratio of the seventh gear 1217 to the fourth gear 1206 engaged with it is i4, the engagement transmission ratio of the fifth gear 1208 to the sixth gear 1209 is i3, and when only the second power source 1215 transmits power to the vehicle axle half shaft, the engagement transmission ratio in the automatic transmission is i4×i3.

In gear shifting, the first clutch 1203 and the second clutch 1207 may probably simultaneously open. At this point, the second power source 1215 is started up, its power is transmitted to the vehicle axle half shaft via the second input shaft 1216, the seventh gear 1217, the fourth gear 1206, the intermediate shaft 1214, the fifth gear 1208, the sixth gear 1209 and the differential 1211, and the engagement transmission ratio in the automatic transmission is i4×i3. That is the third operating condition; that is, the path wherein the power is maintained uninterrupted in gear shifting.

If the first clutch 1203 or the second clutch 1207 is closed, the second power source 1215 is started up, and the power of the second power source 1215 will still be transmitted to the vehicle axle half shaft, to increase the total driving force of the driving assembly.

The other contents of the twelfth embodiment of the present disclosure are the same as those of the eleventh embodiment, and will not be described repeatedly here.

The Thirteenth Embodiment

Figure 13:
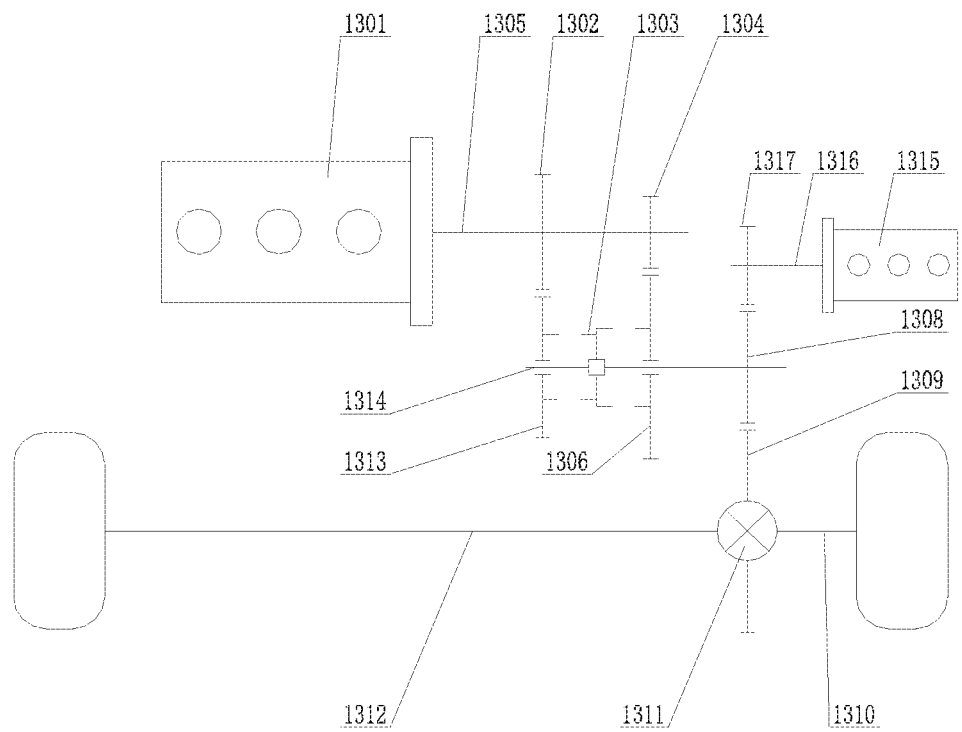
FIG. 13 is the structural schematic diagram of the transversely-placed double-power-source vehicle driving assembly of the thirteenth embodiment of the present disclosure.

FIG. 13 shows the thirteenth embodiment of the present disclosure. The figure shows: 1301. first power source; 1302. first gear; 1303. bidirectional clutch; 1304. third gear; 1305. first input shaft; 1306. fourth gear; 1308. fifth gear; 1309. sixth gear; 1310. right half shaft; 1311. differential; 1312. left half shaft; 1313. second gear; 1314. intermediate shaft; 1315. second power source; 1316. second input shaft; and 1317. seventh gear.

The thirteenth embodiment of the present disclosure is improvement that is made on the basis of the sixth embodiment, and the difference between the thirteenth embodiment and the sixth embodiment of the present disclosure is that, as shown by FIG. 13, the vehicle driving assembly further comprises the second power source 1315, the second power source 1315 connects to the second input shaft 1316, the second input shaft 1316 is arranged parallel to the first input shaft 1305 and the intermediate shaft 1314, the second input shaft 1316 is provided thereon with the seventh gear 1317, and the seventh gear 1317 engages with the fifth gear 1308, to always transmit power to the vehicle axle half shaft, without being affected by the opening or closing of the first clutch 1303 and the second clutch 1307.

The seventh gear 1317, the fifth gear 1308 and the sixth gear 1309 form a triple gear, and the third gear 1304 serves as an idle gear. It is set that the transmission ratio of the triple gear is i4, and when only the second power source 1315 transmits power to the vehicle axle half shaft, the engagement transmission ratio in the automatic transmission is i4.

In gear shifting, the first clutch 1303 and the second clutch 1307 may probably simultaneously open. At this point, the second power source 1315 is started up, its power is transmitted to the vehicle axle half shaft via the second input shaft 1316, the seventh gear 1317, the fifth gear 1308, the sixth gear 1309 and the differential 1311, and the engagement transmission ratio in the automatic transmission is i4. That is the third operating condition; that is, the path wherein the power is maintained uninterrupted in gear shifting.

If the first clutch 1303 or the second clutch 1307 is closed, the second power source 1315 is started up, and the power of the second power source 1315 will still be transmitted to the vehicle axle half shaft, to increase the total driving force of the driving assembly. In the start up of the vehicle, that can shorten the acceleration process of the vehicle, to realize high speed traveling more quickly. When the vehicle is climbing a slope with a weight burden, it can select the double power inputting and the larger speed ratio transmission, to increase the driving force of the entire vehicle and overcome the defect of the deficient driving force of the entire vehicle.

The rotor shaft of the second power source 1315 and the second input shaft 1316 are also of integrated design.

The other contents of the thirteenth embodiment of the present disclosure are the same as those of the sixth embodiment, and will not be described repeatedly here.

The Fourteenth Embodiment

Figure 14:
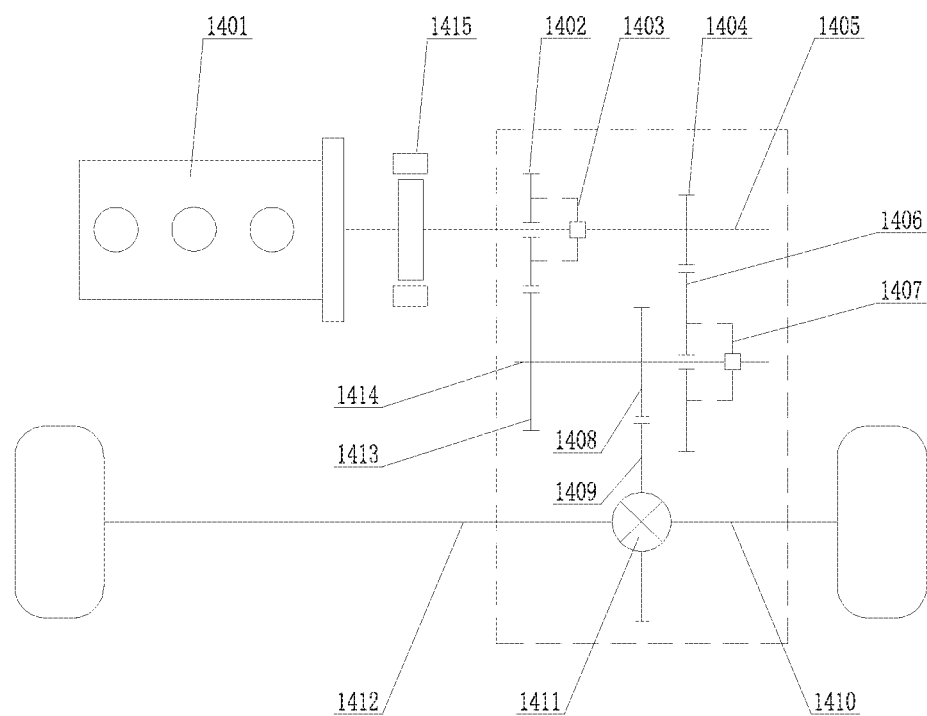
FIG. 14 is the structural schematic diagram of the transversely-placed single-power-source vehicle driving assembly of the fourteenth embodiment of the present disclosure.

FIG. 14 shows the fourteenth embodiment of the present disclosure. The figure shows: 1401. first power source; 1402. first gear; 1403. first clutch; 1404. third gear; 1405. input shaft; 1406. fourth gear; 1407. second clutch; 1408. fifth gear; 1409. sixth gear; 1410. right half shaft; 1411. differential; 1412. left half shaft; 1413. second gear; 1414. intermediate shaft; and 1415. ISG electrical motor.

The fourteenth embodiment of the present disclosure is improvement that is made on the basis of the first embodiment, and the difference between the fourteenth embodiment and the first embodiment of the present disclosure is that, as shown by FIG. 14, the first power source 1401 employs the combination of an engine and the ISG electrical motor.

On the one hand, that design reduces the idle speed loss and pollution of the engine, and on the other hand the ISG electrical motor 1415 serves as the electric generator, and can regenerate electricity and recover energy, to realize the effect of energy saving.

The first power source 1401 is started up, and when both of the first clutch 1403 and the second clutch 1407 are opened, the power of the first power source cannot be transmitted to the vehicle axle half shaft, and the ISG electrical motor 1415 serves as the electric generator, and can regenerate electricity. The electric power is stored into a battery or is used by the operation of the second power source.

When the first power source 1401 is shut, the ISG electrical motor 1415, which serves as the electric motor, can still serve as an auxiliary power source to drive the input shaft 1405, and at this point the ISG electrical motor 1415 is not restricted by the operating characteristics of the engine, and the performance of the ISG electrical motor is implemented sufficiently.

The other contents of the fourteenth embodiment of the present disclosure are the same as those of the first embodiment, and will not be described repeatedly here.

The above are only special embodiments of the present disclosure. By the teaching of the present disclosure, a person skilled in the art can make other modifications or variations on the basis of the above embodiments. A person skilled in the art should appreciate that, the above special descriptions are only for the purpose of better explaining the present disclosure, and the protection scope of the present disclosure should be subject to the protection scope of the claims.

What is claimed is:

1. A transversely-placed vehicle driving assembly, connected to a vehicle axle half shaft, wherein the vehicle driving assembly comprises a first power source, a second power source and an automatic transmission, the automatic transmission is provided with a first input shaft therein, the first power source connects to the first input shaft, and a differential is provided at a joint of the automatic transmission and the vehicle axle half shaft; and in the automatic transmission, an intermediate shaft is provided parallel to the first input shaft, the second power source connects to a second input shaft, the second input shaft is arranged in parallel to the first input shaft and the intermediate shaft; wherein, a first gear and a third gear are fixed or rotatably installed on the first input shaft, and a second gear and a fourth gear are fixed or rotatably installed on the intermediate shaft, wherein the first gear and the second gear are in engaged transmission, and have different installing modes on the shafts, and wherein the third gear and the fourth gear are in engaged transmission, and have different installing modes on the shafts;

when the first gear and/or the third gear are fixed or rotatably installed on the first input shaft, a first clutch is provided between the first input shaft and the gear that is rotatably installed on the first input shaft;

when the second gear and/or the fourth gear are fixed or rotatably installed on the intermediate shaft, a second clutch is provided between the intermediate shaft and the gear that is rotatably installed on the intermediate shaft;

a fifth gear is fixed on the intermediate shaft, and a sixth gear is fixed on the differential, wherein the fifth gear and the sixth gear are in engaged transmission; and the second input shaft is provided thereon with a seventh gear, and the seventh gear engages with the first gear, or the second gear, or the third gear, or the fourth gear, or the fifth gear, to always transmit power to the vehicle axle half shaft, without being affected by the opening or closing of the first clutch and the second clutch.

2. The transversely-placed vehicle driving assembly according to claim 1, wherein, the first gear and/or the third gear are rotatably installed on the first input shaft via a needle bearing, and the second gear and/or the fourth gear are rotatably installed on the intermediate shaft via a needle bearing.

3. The transversely-placed vehicle driving assembly according to claim 2, wherein, the first gear and the third gear are rotatably installed on the first input shaft via a needle bearing, the first clutch is a bidirectional clutch, and the first input shaft is provided thereon with the bidirectional clutch that cooperates with the first gear and the third gear.

4. The transversely-placed vehicle driving assembly according to claim 2, wherein, the second gear and the fourth gear are rotatably installed on the intermediate shaft via a needle bearing, the second clutch is a bidirectional clutch, and the intermediate shaft is provided thereon with the bidirectional clutch that cooperates with the second gear and the fourth gear.

5. The transversely-placed vehicle driving assembly according to claim 1, wherein, an engagement transmission ratio of the first gear to the second gear is i1, an engagement transmission ratio of the third gear to the fourth gear is i2, an engagement transmission ratio of the fifth gear to the sixth gear is i3, and an engagement transmission ratio in the automatic transmission is i1×i3 or i2×i3.

6. The transversely-placed vehicle driving assembly according to claim 1, wherein, the seventh gear and the first gear or the third gear, when engaged, form a triple gear, a transmission ratio of the triple gear is i4, an engagement transmission ratio of the fifth gear to the sixth gear is i3, and when only the second power source transmits power to the vehicle axle half shaft, the engagement transmission ratio in the automatic transmission is i4×i3;

the seventh gear and the second gear or the fourth gear, when engaged, form a dual gear, a transmission ratio of the dual gear is i4, an engagement transmission ratio of the fifth gear to the sixth gear is i3, and when only the second power source transmits power to the vehicle axle half shaft, the engagement transmission ratio in the automatic transmission is i4×i3; and the seventh gear and the fifth gear, when engaged, form a triple gear, a transmission ratio of the triple gear is i4, and when only the second power source transmits power to the vehicle axle half shaft, the engagement transmission ratio in the automatic transmission is i4.

7. The transversely-placed vehicle driving assembly according to claim 1, wherein, a rotor shaft of the first power source and the first input shaft are of integrated design, and a rotor shaft of the second power source and the second input shaft are of integrated design.

8. The transversely-placed vehicle driving assembly according to claim 1, wherein, the first clutch and the second clutch are contrate tooth clutches, comprising a movable fluted disc and a fixed fluted disc, wherein the movable fluted disc is rotatably installed on the first input shaft and/or the intermediate shaft, and the fixed fluted disc is fixed on any gear that is rotatably installed; or the first clutch and the second clutch are wet clutches.

9. The transversely-placed vehicle driving assembly according to claim 8, wherein, the contrate tooth clutches are of electromagnetic driving type, or hydraulic driving type, or pneumatic driving type, or electrical driving type, or mechanic shifting fork driving type, and drive the movable fluted disc to axially move to engage with the fixed fluted disc.

* * * * *